Patented Sept. 25, 1923.

1,468,930

UNITED STATES PATENT OFFICE.

ALAN P. SULLIVAN, OF ST. MARYS, PENNSYLVANIA, ASSIGNOR TO STACKPOLE CARBON COMPANY, A CORPORATION OF PENNSYLVANIA.

ELECTRICAL CEMENT.

No Drawing.   Application filed January 28, 1922.   Serial No. 532,522.

*To all whom it may concern:*

Be it known that I, ALAN P. SULLIVAN, a citizen of the United States, and a resident of St. Marys, county of Elk, and State of Pennsylvania, have invented certain new and useful Improvements in Electrical Cements, of which the following is a specification.

The object of my invention is to produce an electrical cement which will set without heat, will have considerable tensile strength and a low electrical resistance and will have a negligible coefficient of either expansion or contraction while setting. The primary purpose for which this cement is intended, is for use in attaching pig-tails to electric brushes and the like, for by using the ingredients of the cement as a packing to surround the pig tail after it has been inserted in the usual hole in the brush, I am able to make a firm connection of very low resistance, and am able to avoid the use of heat as in soldering or the use of any such pressure as is necessary to make the connection by riveting or similar methods.

The principal ingredients of my cement are finely ground copper powder, magnesium chloride and magnesium oxide. In addition a small amount of finely powdered iron is helpful, and I have also found it advantageous under certain conditions to have present some phosphoric anhydride and a small amount of ammonium chloride. When the cement is to be used, a very little water is added, which develops chemical reactions among the ingredients and causes the cement to set.

In mixing together the ingredients, varying proportions can be used. The copper is the principal conductor of electricity and so should be present in large excess, and in fact should constitute more than 80% of the entire mixture. The magnesium chloride and the magnesium oxide are the principal bonding agents, for in the presence of water they react, as is well known, to form complex oxy-chlorides. I find it advantageous to have from two to ten per cent of magnesium chloride present (preferably the finely ground anhydrous material) and from two to five per cent of magnesium oxide. These two ingredients alone will serve to bond copper powder, but the strength of the product is materially increased and its electrical resistance is reduced if from four to sixteen per cent of iron powder is included in the mixture. The use of phosphoric anhydride and ammonium chloride is not so important, but good results can be obtained if up to two per cent of the phosphoric anhydride and up to one per cent of the ammonium chloride are present. The formula which I have found most satisfactory is the following:

| | |
|---|---|
| Copper powder | 83.8% |
| Iron powder | 8.4% |
| Magnesium chloride | 4.2% |
| Magnesium oxide | 2.5% |
| Phosphoric anhydride | .8% |
| Ammonium chloride | .3% |

The finely powdered ingredients are mixed together in a ball mill and, provided they are not allowed to become moistened, will keep for a long time. When the cement is to be used it is mixed with about five per cent by weight of water and then should be applied promptly. It will be found to have set thoroughly in the course of a few hours.

When using this cement in the attachment of pig tails to electric brushes, a hole is made in the brush in which the pig tail and the cement are inserted. If desired, a second hole may be made through the brush running transversely to the hole in which the pig tail is placed. If this is done the cement may be packed in this second hole so that the pig tail is completely imbedded in the cement.

Other uses for this cement will be recognized by those skilled in the art, as for example in making connections at a switchboard where the cement may be used under some conditions in place of solder.

It is to be understood that the proportions set forth above are given for illustrative purposes only, and that my invention is not to be limited to any specific proportions of ingredients, and that many variations and substitutions of equivalents can be made without departing from the spirit of my invention.

What I claim is:

1. An electrical cement comprising more than 80% of copper powder together with magnesium chloride and magnesium oxide.

2. An electrical cement comprising copper powder of from 80 to 92%, iron powder of from 4 to 16%, magnesium chloride of from 2 to 10% and magnesium oxide of from 2 to 5%.

3. An electrical cement comprising copper powder from 80 to 92%, iron powder from 4 to 16%, magnesium chloride from 2 to 10%, magnesium oxide from 2 to 5% and phosphoric anhydride not in excess of 2% and ammonium chloride not in excess of 1%.

4. An electrical cement of substantially the following composition: copper powder 83.8%, iron powder 8.4%, magnesium chloride 4.2%, magnesium oxide 2.5%, phosphonic anhydride .8%, ammonium chloride .3%.

ALAN P. SULLIVAN.